March 7, 1933.  A. J. SORENSEN  1,900,410

ELECTRIC CONTROL SYSTEM

Filed Oct. 8, 1931  3 Sheets-Sheet 3

INVENTOR:
A.J. Sorensen
by
His ATTORNEY.

Patented Mar. 7, 1933

1,900,410

UNITED STATES PATENT OFFICE

ANDREW J. SORENSEN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRIC CONTROL SYSTEM

Application filed October 8, 1931. Serial No. 567,549.

My invention relates to electric control systems, and particularly to electric control systems for the brakes of railway trains.

I will describe certain forms of apparatus embodying my invention, and will then point out the novel features thereof in claims.

Figure 1:
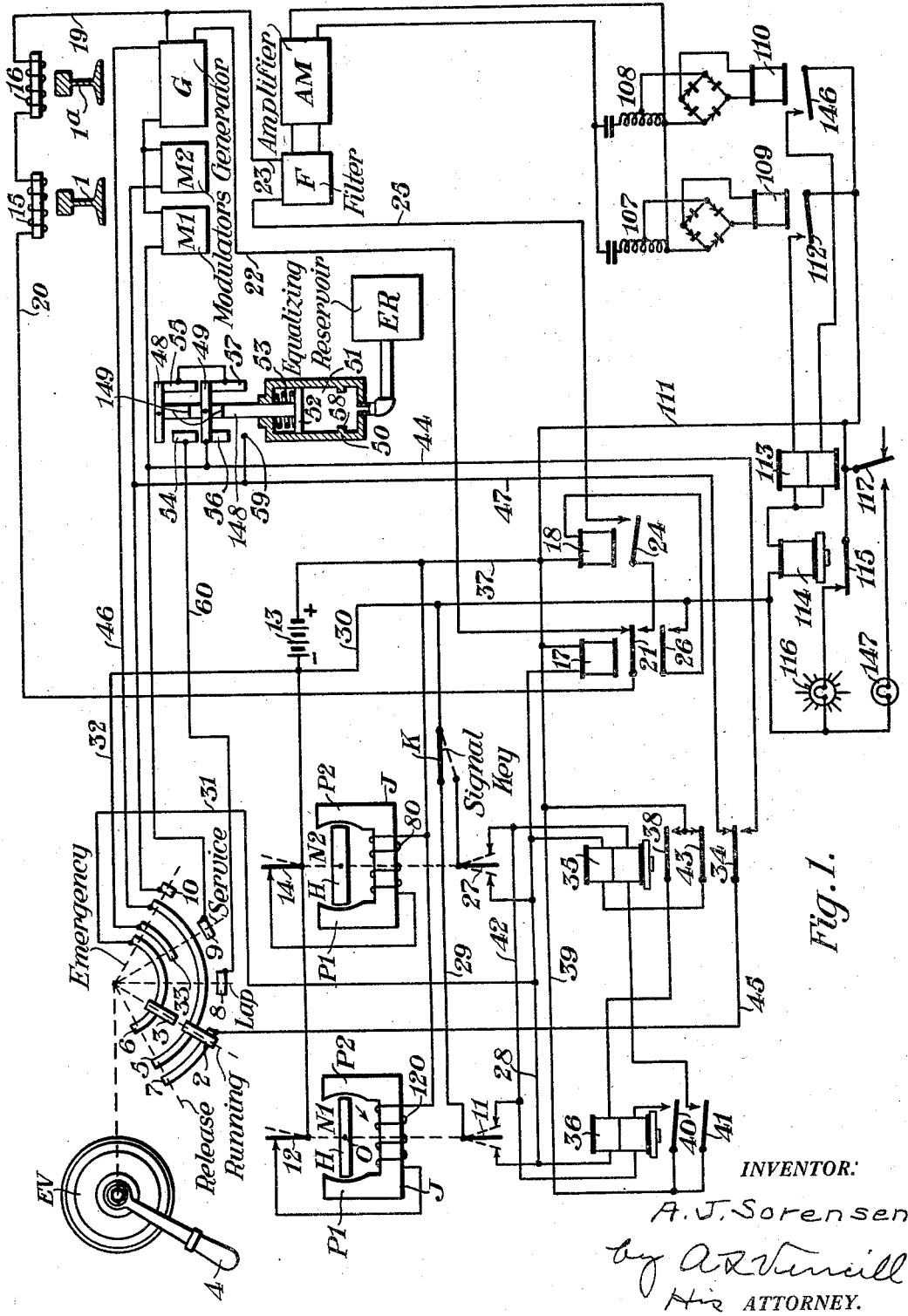
Figure 2:
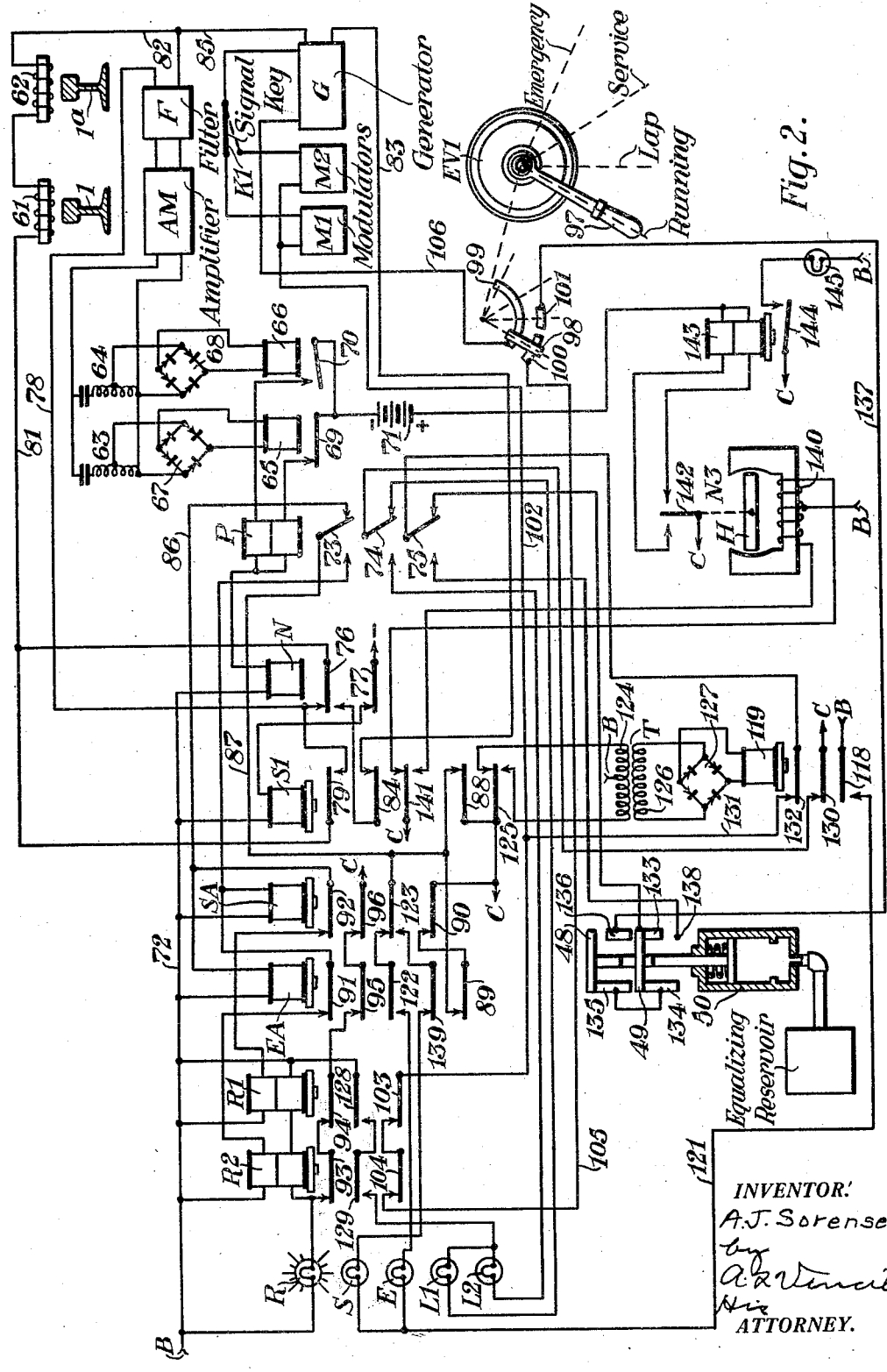

In the accompanying drawings, Figs. 1 and 2 constitute a diagrammatic view of one form of apparatus embodying my invention when applied to a communicating and brake control system for a railway train. The apparatus of Fig. 1 is that located at the control point, which, in this instance, is on the locomotive with the operation of the apparatus governed by the condition of the usual engineer's brake valve. The apparatus of Fig. 2 is that installed at another point on the train. While the apparatus of Fig. 2 may be located at any point on the train, it will be referred to in the following description as being mounted in the caboose of a freight train. The control of the air brakes at the caboose is accomplished manually. The instructions as to the condition of the brakes to be established at the caboose is transmitted from the locomotive by different codes. The code transmitted by the locomotive apparatus is automatically selected in accordance with the position of the handle of the engineer's brake valve. These codes are preferably in the form of modulated carrier current impulses transmitted through the medium of the traffic rails in the manner disclosed and claimed in the L. O. Grondahl application for United States Letters Patent, Serial No. 450,135, filed May 6, 1930. A single code is used for each of the running, service and emergency positions, respectively, while for the lap position I propose to use two different codes depending upon whether a light or heavy brake application has been made at the locomotive. When the operator in the caboose has set his brake valve in the condition corresponding to the code transmitted from the locomotive, a return indication is transmitted to the locomotive that actuates an indicating device by which the operator on the locomotive is informed whether or not the brake condition he has established is being duplicated at the caboose. In addition to the brake control and indicating features, communicating messages can be sent in either direction whenever the brake controlling mechanism occupies either the running or lap condition by changing the code speed.

Figure 3:
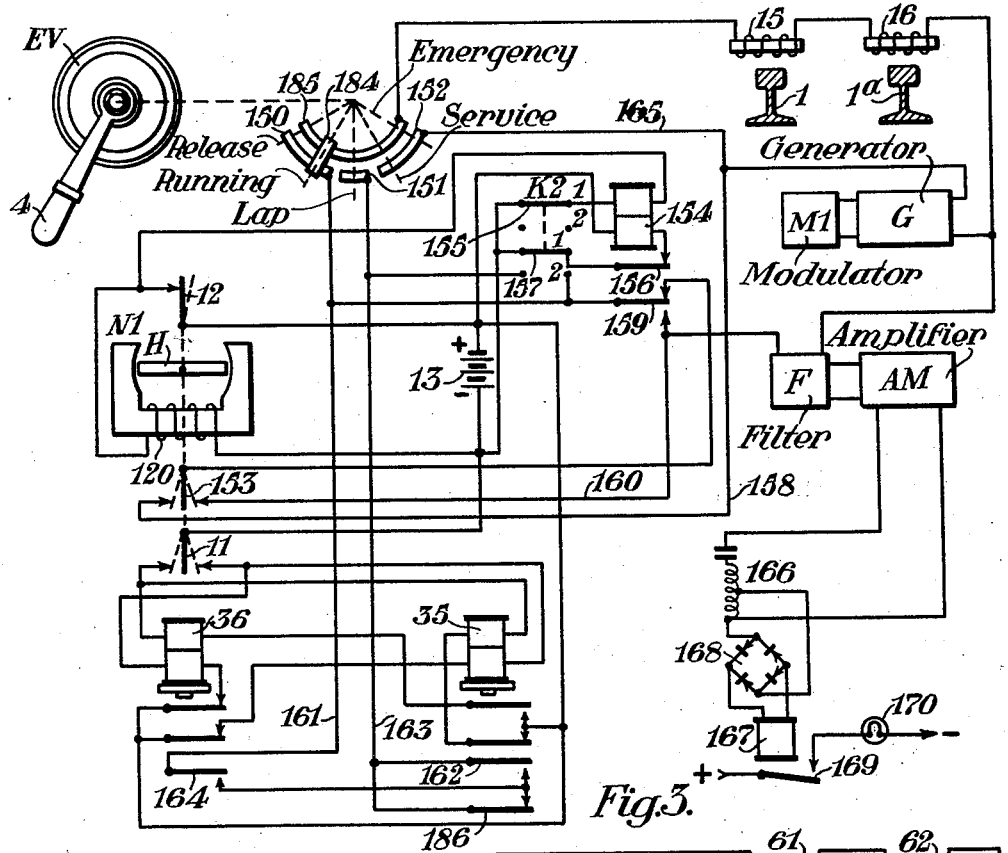
Figure 4:
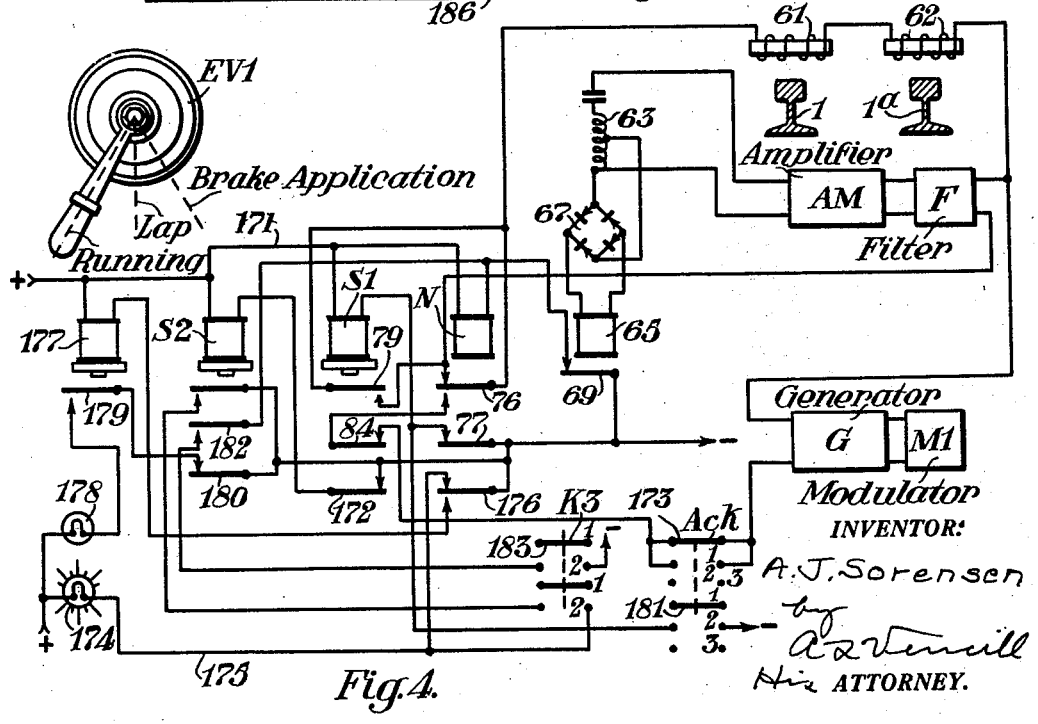

Figs. 3 and 4 when taken together constitute a diagrammatic view of a modified form of my invention. The apparatus of Fig. 3 is that installed on the locomotive while that of Fig. 4 is mounted in the caboose. In this modified form, one code is used for both service and emergency applications, so that in the caboose a given reduction in the brake pipe pressure, which may be of any convenient value, is to be established whenever an application code is received in response to either a service or emergency condition having been established on the locomotive. Thus the manually operated brake valve in the caboose has but three positions, running, lap and brake application. This modified form having but one predetermined degree of application, two distinctive control codes for the lap position as provided in the form of my invention as disclosed in Figs. 1 and 2 are no longer needed and the lap position is here distinguished from the running condition by omitting every other code impulse. In this system of Figs. 3 and 4, the method of breaking in on the control code for conveying communicating messages is somewhat different from the manner used in the system of Figs. 1 and 2 so that only one code speed is required as will appear as the specifications progress.

In each of the several views like reference characters designate similar parts.

Although I am herein disclosing a specific application for my invention, it will be understood that I do not wish to limit myself to control systems for railway trains as my invention is equally useful in other control systems where the operation of apparatus located at one point is to be supervised by an operator at a remote point.

Referring to Fig. 1, the reference character EV designates the usual engineer's brake valve of the standard type capable of establishing the "release", "running", "lap", "service" and "emergency" conditions of the brake pipe pressure. As shown schematically, the contactors 2 and 3 are connected to and actuated by the handle 4 of the brake valve EV. These contactors 2 and 3 engage the arcuate contact members 5 and 6, respectively, in all positions of the handle 4. The contactor 2 is adapted to engage the contact 7 in both the running and release positions, and to engage the contacts 8, 9 and 10 in the lap, service and emergency positions, respectively. The contactor 3 engages the contact 33 in both the service and emergency positions of the handle 4.

The locomotive is provided with two mechanically tuned oscillators designated by the reference characters N1 and N2. Although these oscillators may be one of many types, a preferred form is that disclosed and described in Paul N. Bossart application for Letters Patent of the United States, Serial No. 398,342, filed October 9, 1929, for coding apparatus, and it will suffice for this description to say that each consists of a field structure J between the poles P1 and P2 of which there is mounted an armature H pivoted at O. Referring to oscillator N1, its armature H is biased to a mid position between the poles P1 and P2 as shown in Fig. 1. In this position the contact members 11 and 12 actuated by the armature H occupy the position shown by a heavy line in the figure. The field winding 120 is connected to a battery 13 all the time that the system is in service by a simple circuit that includes the contact 12 as will be readily seen by an inspection of Fig. 1. In a like manner the field winding 80 of oscillator N2 is connected to the battery 13 by a simple circuit that includes its own contact 14. The energizing of the field winding 120 of N1 causes its armature H to rotate in a direction indicated by an arrow. After a slight movement of armature H the contact 12 is ruptured. The armature H will rotate a little farther and then, due to its bias, will reverse its movement until the contact 12 is again closed and the field winding 120 reenergized. During the first movement of armature H the contact 11 engages its left-hand contact. The inertia of armature H in its return movement will carry it past the normal position far enough so that the contact member 11 will engage a right-hand contact. The biasing and the weight of the armature H is made so that it will have a natural period of say one hundred twenty cycles per minute, and will oscillate at this frequency as long as current is supplied to the field winding by the circuit that includes the contact 12. It follows then that the contact member 11 will oscillate between its left-hand and right-hand contacts as long as the system is in service. The oscillator N2 is similar except that its biasing and the weight of its armature H is made so that it has a natural period of say eighty cycles per minute at which frequency it will oscillate the contact member 27 as long as its field winding 80 is energized by the circuit that includes the contact 14. As stated above these oscillators N1 and N2 are in constant operation whenever the system is in service, the oscillator N1 being normally effective to govern the control code impulses as will be pointed out later, while the oscillator N2 is rendered effective during periods when signal messages are to be transmitted.

At the control point there is provided a generator G of carrier current of a frequency, say for example, of five thousand cycles per second. The output of the generator G is modulated in the usual manner by the modulators M1 and M2 which may be generators of low frequency current of say forty and fifty cycles per second, respectively. However, it will be understood that my invention is not limited to these specific frequencies given for the generator G, modulators M1 and M2 and for the oscillators N1 and N2, but these frequencies are stated by way of illustration only. Generator G and modulators M1 and M2 may be one of many well-known types among them being the vacuum tube type. As the specific type of neither the generator G nor the modulators M1 and M2 form a part of my invention they are indicated by symbols only in order to simplify the drawings.

15 and 16 are inductor coils located on the locomotive in inductive relation with the traffic rails 1 and 1ª, respectively. By means of these inductor coils energy is transmitted to and received from the traffic rails. The coils 15 and 16 are switched from a transmitting circuit to a receiving circuit by means of the relays 17 and 18. An inspection of Fig. 1 will show that when the relay 17 is energized, a transmitting circuit is formed from the output of the generator G along wire 19, coils 16 and 15 in series, wire 20, front contact of armature 21 of relay 17 and wire 22 to the opposite terminal of generator G. When the relay 17 is deenergized and at the same time relay 18 is energized, a receiving circuit from a filter F to be referred to later, is closed along wires 23 and 19, coils 16 and 15, wire 20, back contact of armature 21 of relay 17, front contact of armature 24 of relay 18 and wire 25 to the opposite terminal of the filter F. The relay 18 is energized by current from the battery 13 over a simple circuit that includes the back contact of the armature 26 of relay 17. The reason for the addition of the relay 18 is that I have found that in changing from a transmitting to receiving condition, it takes an appreciable length of time for energy in the inductor coils to decay in such a manner that it does not interfere with the reception of incoming impulses. I have also found that the time interval between the opening of a front contact and the closing of a back contact of a relay is too short for this decay to take place. If to this interval of time there is added the interval that it takes for a relay such as 18 to pick up after the relay 17 is dropped, the resulting interval of time is long enough so that interference between transmitting and receiving is avoided.

The oscillators N1 and N2 control at their lower contact members 11 and 27, respectively, the operation of the relay 17. With the left-hand contact of 11 closed, current is supplied from the positive terminal of the battery 13 through wire 37, winding of relay 17, wire 28, left-hand contact of 11, wire 29, the normally closed contact of a signal key K and wire 30 to the negative terminal of the battery 13. It follows that during the interval the contact 11 is in the left-hand position, the relay 17 is energized, and during the interval the contact 11 is swung to its right-hand position, the relay 17 is deenergized. Thus time is divided into sending and receiving periods by the oscillator N1 which, as stated above, has a frequency of operation of one hundred twenty cycles per minute. In the event the key K is depressed so that it occupies the dotted line position, the control of the relay 17 is transferred to the left-hand contact of 27 of the oscillator N2. The division of time between sending and receiving periods will still prevail, the difference being that changing from sending to the receiving position, instead of being one hundred twenty times per minute, will now be at the rate of eighty times per minute. When the handle 4 is moved to either the service or emergency position so that the contactor 3 engages the contacts 6 and 33, a circuit is closed from positive battery 13 through the winding of the relay 17 along wires 28 and 31, contacts 6, 3 and 33, and wire 32 to the negative terminal of battery 13 to constantly energize relay 17. Thus under either the service or emergency condition of the brake valve EV the transmitting circuit on the locomotive is held constantly closed.

Under the release and running positions of the handle 4 the carrier current supplied to the generator G is alternately modulated in cyclic order by the two modulators M1 and M2 by circuits controlled by the contact 7 of handle 4 and the armature 34 of a relay 35 in the following manner. Suppose the relay 35 and its associated relay 36 are both deenergized and that the contact 11 is closed toward the left. As the left-hand contact of 11 is closed, the relay 36 receives current from the battery 13 through a circuit that extends from the positive terminal of battery 13 over wire 37, back contact of armature 38 of relay 35, top winding of relay 36, left-hand contact of 11, wire 29, key K and wire 30 back to the battery 13. When contact 11 changes position to make contact toward the right, the relay 36 does not drop because it is made slightly slow-releasing. A circuit can now be traced from the positive terminal of battery 13 along wires 37 and 39, front contact of armature 40, lower winding of relay 36, right-hand contact of 11, wire 29, key K and wire 30 to the negative terminal of battery 13. Another circuit is also closed that branches from the wire 39 through the front contact of the armature 41 of relay 36, lower winding of the relay 35, wire 42 to the right-hand contact of 11 and then to the negative terminal of the battery 13 by the same circuit above traced with the result that the relay 35 is energized. When contact 11 next swings to the left, the relay 35 does not drop as it is slightly slow-releasing and thus a circuit to its top winding is closed from the wire 37 through the front contact of armature 43, top winding of the relay 35, wire 28, left-hand contact of 11 and then to the negative terminal of the battery 13. This time as 11 makes toward the left the circuit to the top winding of the relay 36 is held open at the back contact of the armature 38 of relay 35. The release period of relay 36 is such that before 11 can swing back toward the right, so as to close the circuit to the lower winding of relay 36, the relay drops. When contact 11 next swings toward the right, the circuit to the lower winding of relay 35 is held open at the front contact of the armature 41 of relay 36. The release time for the relay 35 is made such that before 11 next swings to the left to close the circuit to top winding of the relay 35 that relay drops. Hence both relays 35 and 36 are now down and ready to start the above cycle of operation all over again as contact 11 next swings to the left. Recalling that the relay 17 is picked up to close the sending circuit each time that contact 11 makes toward the left, it will be seen from the above that during every odd sending period the relay 35 is down and that during every even sending period the relay 35 is up.

During the first sending period when relay 35 is down the modulator M1 is connected to the generator G by a circuit along wire 44, back contact of armature 34 of relay 35, wire 45, contacts 7, 2 and 5, wire 46, generator G and to the opposite terminal of the modulator M1. During the second sending period when relay 35 is up, the modulator M1 is disconnected and a circuit is completed for the modulator M2 along wire 47, front contact of armature 34 and then the same as traced for the modulator M1. Thus under either the release or running condition of the brake valve EV the impulses of carrier current supplied to the traffic rails through the coils 15 and 16 are alternately modulated at the frequency of M1 and M2 in cyclic order. When the signal key K is depressed the contact 27 of oscillator N2 is effective to operate the relays 35 and 36 in a manner similar to that described for the contact 11 of the oscillator N1. The operation of the apparatus, however, is slower making the length of the impulses transmitted of a somewhat longer duration.

In lap position of the brake valve EV the modulation of the generator G is not only controlled by the contact 8 associated with the lap position of the handle 4, but is controlled also by the contactors 48 and 49 actuated by a piston 52 of a pressure actuated device 50. These contactors are mounted on the stem 148 of piston 52 and are properly insulated from each other as indicated in the figure by insulations 149. The chamber 51 of the device 50 is connected to the equalizing reservoir ER and thus the pressure from ER forces the piston 52 upward in the drawing against the action of a spring 53. When the pressure in the equalizing reservoir is, say seventy pounds, the piston 52 is forced to the position as shown in the drawings where the contactor 48 is lifted above the associated contact 54, and the contactor 49 engages the associated contacts 56 and 57. When a light reduction is made in the pressure of the equalizing reservoir ER, say, a ten pound reduction, the spring 53 forces the piston 52 downward to a point where the contactor 48 engages both contacts 54 and 55. The length of the contacts 56 and 57 is made such that the contactor 49 still engages with them even after a ten pound reduction is made in the pressure. When a heavy reduction is made in the equalizing reservoir pressure, say a twenty pound reduction, then the piston 52 is forced downward by the spring against the stop 58. The length of the contacts 54 and 55 are such that the contactor 48 still engages with them, but the contactor 49 no longer engages contact 56 but now engages with contacts 59 and 57. With a light brake application made so that about a ten pound reduction is made in the pressure of equalizing reservoir ER, and the handle 4 then moved to the lap position, the modulator M1 is connected to the generator G by a circuit that includes the wire 47, contact 56, contactor 49, contacts 57 and 55, contactor 48, contact 54, wire 60, contacts 8, 2 and 5 associated with the handle 4, wire 46, generator G to the other terminal of the modulator M1. If a heavy brake application has been made so that, say a twenty pound reduction of the pressure in the reservoir ER results, and the handle 4 is then placed at its lap position, the modulator M2 is connected to the generator G by a circuit along wire 47, contact 59, contactor 49, contacts 57 and 55, contactor 48, contact 54 and then as above traced. It will thus be seen that when a light application has been made and the handle 4 placed in its lap position, the impulses transmitted by the locomotive apparatus are all modulated at the frequency of M1, and that the impulses are all modulated at the frequency of M2 if a heavy application has been made. By operating the key K, the length of the impulse transmitted under the lap condition are determined by the oscillator N2.

When the handle 4 is moved to the service position, the relay 17 is retained steadily energized by the circuit that includes the contacts 3, 6 and 33, and a circuit is completed for the modulator M1 through the contacts 9, 2 and 5 as will be clear from an inspection of Fig. 1. The locomotive equipment now will constantly transmit carrier current modulated at the frequency of M1. When the handle 4 is moved to the emergency position, the relay 17 is retained constantly energized the same as in the service position and a circuit is now closed for the modulator M2 through the contacts 10, 2 and 5. Thus under the emergency condition carrier current is continuously transmitted from the locomotive modulated at the frequency of M2. It is to be noted that the signal key K is ineffective during either the service or emergency condition.

To sum up thus far, the apparatus on the locomotive under the running condition alternately assumes transmitting and receiving conditions at a rate determined by the oscillator N1 and the impulses of carrier current transmitted are alternately modulated at the frequency of M1 and M2 in cyclic order. Under the lap condition, each impulse of carrier current is modulated at the frequency of M1 if a light application has been made and each impulse is modulated at the frequency of M2 if a heavy application has been made. Under both service and emergency conditions, carrier current is continuously transmitted, the modulation being that of M1 for the service condition and that of M2 for the emergency condition. A new rate for the impulse is established under either the running or lap condition when the signal key K is actuated.

Although a specific code arrangement is here shown and described, my invention is not confined to this one arrangement as other codes could as readily be established for the different conditions to be set up without departing from the spirit and scope of my invention. As a matter of fact, additional codes could be added if it seemed desirable to do so. The arrangement here described will serve, however, to illustrate the principle of my invention.

Referring to Fig. 2, the apparatus installed in the caboose includes the inductor coils 61 and 62 similar to the coils 15 and 16 mounted on the locomotive and these coils at the caboose are also located in inductive relation with the traffic rails 1 and 1ª. The coils 61 and 62 are, at times connected to the input circuit of a filter F through which current is applied to an amplifier AM. This filter F and amplifier AM may be one of many well-known types, and as their specific type forms no part of my invention they are indicated in the drawings by symbols only. The output of the amplifier AM is applied to a selective network including two sharply tuned circuits 63 and 64 which in turn operate the primary relays 65 and 66, respectively. These selective circuits 63 and 64 are respectively tuned to resonance at the frequencies of the modulators M1 and M2 on the locomotive. Thus with carrier current modulated at the frequency of M1 picked up by the coils 61 and 62 and applied to the amplifier AM the circuit 63 supplies current to the relay 65 through a full-wave rectifier 67 to energize that relay. When the carrier current is modulated at the frequency of M2, the circuit 64 is responsive and supplies current to the relay 66 through the rectifier 68 to energize that relay. When the carrier current is periodically interrupted, the primary relays 65 and 66 will be operated in step with the impulses in accordance with the modulation. It follows then that whichever modulating frequency is applied to the carrier current supplied to the transmitting circuit by the apparatus at the control point the corresponding primary relay in the caboose is energized, and will operate its armature in step with the impulses when the carrier current is periodically interrupted.

Associated with the primary relays 65 and 66 are three relays designated by the reference characters P, N and S1. The relays N and S1 are direct current neutral relays but the relay P is a polarized relay provided with two windings and is so constructed that when it becomes deenergized its armatures remain in the position to which they were last moved. When the primary relay 65 is energized, a circuit is completed from the positive terminal of a battery 71 which terminal is designated throughout the Fig. 2 by the reference character B, along wire 72, winding of relay N, lower winding of the relay P and front contact of armature 69 of the relay 65 to the negative terminal of the battery 71. The polarity of the magnetic field created by the energizing of the lower winding of relay P is such as to cause the polarized armatures 73, 74 and 75 to be shifted to the right-hand position, that is the position as shown in the figure. Likewise when the relay 66 is energized a circuit is completed from the positive terminal B along wire 72, winding of relay N, top winding of the relay P and front contact of the armature 70 to the negative terminal of the battery 71. The polarity of the magnetic field created by the energizing of the top winding of the relay P is such as to cause the polarized armatures of that relay to be shifted to the left-hand position. With either of these last two circuits closed so that the relay N is energized the armatures 76 and 77 are lifted into engagement with front contacts. Whenever relay N is energized, current flows to the winding of the relay S1 from the wire 72 and then to the negative terminal of the battery 71 through the front contact of the armature 77.

The relays S1 and N divide time into transmitting and receiving periods in such a way that when the relay S1 is energized and relay N deenergized, the inductor coils 61 and 62 are connected to a transmitting circuit, to be shortly pointed out, and at all other times to a receiving circuit. This receiving circuit can be traced from filter F along the wire 78, back contact of armature 79 of relay S1, wire 81, coils 61 and 62 and wire 82 to the other terminal of the filter F. This receiving circuit is also closed through the front contact of the armature 76 of relay N which is in parallel with the back contact of the armature 79. From what has previously been said it is seen that with either of the primary relays 65 or 66 operated in response to periodic impulses of modulating carrier current the relays N and S1 are also operated. The relay N operates exactly in step with the operation of the primary relays but the relay S1 will remain energized for a period after the relay N drops due to the fact that it is provided with slow-release characteristics. While the relay S1 remains up after relay N drops, a transmitting circuit is closed on the caboose from a generator G, to be shortly referred to, along wire 83, front contact of armature 84, back contact of armature 76, wire 81, coils 61 and 62 and wires 82 and 85 to the other terminal of the generator G. Furthermore, when either relay 65 or 66 is held continuously energized in response to a continuous impulse of carrier current picked up from the traffic rails, the relay N is held constantly energized and the above traced receiving circuit on the caboose is held constantly closed at the front contact of the armature 76, while the transmitting circuit is held open at the back contact of armature 76. Thus it follows that the caboose apparatus is shifted from receiving to transmitting condition in response to the operation of the primary relays 65 and 66 or is continuously held in the receiving condition if a primary relay remains continuously energized.

By means of relays R1, R2, EA and SA in the caboose the control codes picked up from the traffic rails are translated into different control signals by which the operator in the caboose is governed in controlling the brakes. Suppose the relays of Fig. 2 are all deenergized and that a code corresponding to the running condition of the valve EV is transmitted by the locomotive apparatus, that is, the code transmitted consists of periodic impulses of carrier current occurring at the rate of one hundred twenty times per minute alternately modulated at the frequency of M1 and M2. As the first impulse is received, relay 65 is energized and relays S1 and N are in turn picked up and the polarized armatures of the relay P held in the right-hand position. While the impulse lasts, a circuit is established from the positive terminal B along wire 72, winding of the relay EA, wire 86, right-hand contact of armature 73, wire 87, front contact of armature 88 of relay S1 to the negative terminal of battery 71 which is designated by the reference character C, and thus the relay EA becomes energized during the first impulse. Upon the receipt of the second impulse, the relay 66 is operated and relays S1 and N again operate as before but the relay P is now reversed to the left-hand position and a circuit is established from the positive terminal B through the winding of the relay SA, the left-hand contact of the armature 73 and then to the negative terminal C of the battery 71 by the same circuit as traced for the relay EA and thus the relay SA is energized during the second impulse. Since both relays EA and SA are slow-releasing, they remain energized as long as these control impulses alternately modulated at the frequency of M1 and M2 are received at the caboose.

When relay SA is picked up during the second impulse, current flows from the positive terminal B through the top winding of the relay R2, front contact of armature 91 of relay EA, as that relay is now up, left-hand contact of the armature 73, wire 87, front contacts of armatures 89 and 90 in series, and to the negative terminal C. Upon the receipt of the next or third impulse which is modulated by M1, current flows from the positive terminal B through the top winding of the relay R1, front contact of the armature 92 of the relay SA, wire 86, right-hand contact of the armature 73 to the negative terminal C through the front contacts of armatures 89 and 90 in series. The relays R2 and R1 are made slow-releasing so that the first one of these relays to be picked up will remain energized until the next impulse operates the armature 73 to pick up the other relay. After all four relays R2, R1, EA and SA are energized, a stick circuit is completed for the relays R1 and R2 that can be traced from the positive terminal B through the lower windings of relays R1 and R2 in series through front contacts of armatures 93, 94, 95 and 96 to the negative terminal C. Hence, as long as both relays EA and SA are retained energized by the control code, the two relays R1 and R2 are retained energized by this stick circuit. While these four relays just mentioned are held energized, a circuit is closed to the signal R that passes from the positive terminal B through the signal R, to the negative terminal C through the front contacts of the armatures 93, 94, 95 and 96.

It should be here noted that once both the relays EA and SA are energized, the current energizing these two relays does not flow through the front contact of armature 88 of relay S1 only but also through the contacts of armatures 89 and 90. Thus it follows that the interval each of the relays EA and SA is energized during the alternate impulses is governed by the time the relay P holds the control circuit closed. The operation of the relay S1 by each incoming impulse causes current to flow from the positive terminal B alternately through the two halves of the primary winding 124 of a transformer T the circuit being completed for the right-half of primary 124 at the front contact of the armature 125 of relay S1 and for the left-half of 124 at the back contact of the armature 125. The output of the secondary 126 of transformer T is rectified by a full-wave rectifier 127 and supplied to the winding of a relay 119, and thus it follows that as the relay S1 is operated, the relay 119 is energized. Due to the slow-release characteristics with which this relay 119 is provided it will remain energized as long as the relay S1 is operated.

In the caboose there is installed a brake valve EV1 similar in all respects to the energizing brake valve EV on the locomotive except that it has no release position. The caboose will, of course, be provided with an air compressor, feed valve, equalizing reservoir and other air apparatus necessary to insure the control of the brake pipe pressure by the valve EV1 the same as is accomplished by the valve EV on the locomotive except for the release condition. Whenever the signal R is displayed, the operator in the caboose will place the handle 97 of the valve EV1 at the running position to thereby duplicate at the caboose the running condition of the brake pipe pressure as established on the locomotive. As shown schematically, the contactor 98 is connected to the handle 97 and is adapted to engage the arcuate contact member 99 in all positions of the handle 97, and to engage the contacts 100 and 101 in the running and lap positions, respectively.

The caboose is also provided with a generator G of carrier frequency current and two modulators M1 and M2 all of which are preferably similar to those described for Fig. 1. As pointed out earlier in the specification, the transmitting circuit for the generator G of Fig. 2 is closed during the interval that the relay S1 remains up after the relay N is deenergized. That is to say, the transmitting circuit in the caboose is closed for an interval equal to the slow-release period of relay S1 after the completion of the receipt of a control code impulse. As the operator in the caboose places the handle 97 at the running position in response to display of the signal R, the modulator M1 in the caboose is connected to the generator G by a circuit from a terminal of M1 along wire 102, front contact of armature 103 of relay R1, front contact of armature 104 of relay R2, wire 105, contacts 100, 98 and 99, wire 106, generator G, normally closed contact of a signal key K1 to the other terminal of the modulator M1. Consequently, after the receipt of each impulse of the control code an impulse is transmitted to the traffic rails by the caboose apparatus under the running condition o fthe brake valve which is modulated at the frequency of the modulator M1 in the caboose.

Again referring to Fig. 1, the locomotive apparatus includes a filter F and an amplifier AM which may be and preferably are similar to the filter and amplifier mounted in the caboose. It was previously pointed out that the receiving circuit for the filter F of Fig. 1 is closed through the front contact of the armature 24 of relay 18 when that relay is picked up each time the relay 17 becomes deenergized as the contact 11 of the oscillator N1 swings towards the right. The current supplied to this receiving circuit is applied to the amplifier AM whose output includes two sharply tuned circuits 107 and 108, which are respectively tuned to resonance at the frequency of the modulators M1 and M2 in the caboose. It follows then that when the return impulse transmitted by the caboose and in turn received on the locomotive is modulated at the frequency of M1, the relay 109 is energized and when the impulse is modulated at the frequency of M2, the relay 110 is energized. When relay 109 is picked up, a circuit is closed from the positive terminal of the battery 13 along the wires 37 and 111, front contact of armature 112 of relay 109, top winding of a relay 113, winding of a relay 114 and the wire 30 to the negative terminal of battery 13. With the relay 114 energized, current is supplied from the wire 111 through the front contact of its armature 115 to the indicating device 116 which may be either a light or a magnet with an indicator arm. The magnetic field created by the energizing of the top winding of the relay 113 is such as to hold the polarized armature 117 in the right-hand position. The relay 114 is made slow-releasing and thus as long as the return impulses are received at the usual rate of occurrence, the indicating device 116 is displayed continuously to inform the locomotive operator that the operator in the caboose has placed his valve EV1 at the running position.

Assume now a light brake application is initiated by the operator on the locomotive by his placing the valve EV at the service position. As the handle 4 is moved to the service position, carrier current is constantly transmitted from the locomotive modulated at the frequency of M1 with the result that at the caboose the primary relay 65 is held constantly energized and in turn the relays N and S1 are constantly energized and the polarized armatures of the relay P are held toward the right. With armature 73 held in the right-hand position, the relay EA is energized but the relay SA is allowed to drop. As soon as the relay SA drops, the circuits to the relays R1 and R2 are opened at the front contacts of the armatures 92 and 96 and these relays drop to also open the circuit to the signal R and the signal R is extinguished. As the relay S1 is no longer operated, the relay 119 becomes deenergized and a circuit can be traced from the positive terminal B through the back contact of armature 118 of relay 119, wire 121, signal S, front contact of the armature 139 of relay EA, back contact of armature 123 of relay SA, and front contact of armature 88 of relay S1 to the negative terminal C.

In response to the display of the signal S in the caboose the operator will place his valve EV1 at the service position. As we are assuming that only a light service application is to be made, the operator on the locomotive after, say a ten pound brake pipe reduction has been made will place his valve handle 4 at the lap position. The coils 15 and 16 are now again alternately connected to the transmitting and receiving circuits by the action of the relays 17 and 18 in the same manner as described under the running condition. As the contactor 2 now engages the contacts 8 and 5 and as the pressure in the equalizing reservoir ER is reduced ten pounds so that the device 50 has functioned to bring the contactor 48 into engagement with the contacts 54 and 55, the modulator M1 is connected with the generator G by a circuit through the wire 44, contacts 56, 49, 57, 55, 48 and 54, wire 60, contacts 8, 2 and 5 associated with the handle 4, wire 46 to the generator G and then to the other terminal of M1. It follows, then, that each impulse transmitted under lap condition of the brake valve EV after a light application of the brakes is modulated at the frequency of M1.

As the coils 61 and 62 at the caboose pick up impulses all modulated at the frequency of M1, the relay 65 is operated once each impulse with the result that the relays N and S1 are operated and the polarized armatures of the relay P are constantly held towards the right. The operation of the relay S1 results in the energizing of the relay 119 as previously pointed out and a circuit is thus closed from the positive terminal B through wire 72, back contacts of armatures 128 and 129 in series, signal L1, the right-hand contact of armature 74 and the front contact of armature 130 of the relay 119 to the negative terminal C. The signal L1 is therefore displayed indicating to the caboose operator that only a light application has been made on the locomotive and that he is to make a similar light application at the caboose.

The caboose equipment includes a pressure actuated device 50 similar to the pressure device 50 on the locomotive and its contactors 48 and 49 are actuated in response to a change in the pressure of the equalizing reservoir ER in the caboose in the same manner as these contactors of the locomotive device are actuated in response to a change in the pressure of its associated equalizing reservoir. Thus it is thought that the caboose device 50 needs no further description. When the caboose operator has made a light application in response to the display of the signal S and the subsequent display of the signal L1 he will lap his valve handle 97. A circuit is now completed for the caboose modulator M1 along wires 102 and 131, front contact of the armature 132 of relay 119, right-hand contact of armature 75, contacts 133, 49, 134, 135, 48 and 136 of the device 50, wire 137, contacts 101, 98 and 99 associated with the handle 97, wire 106, generator G, key K1 and to the other terminal of the modulator M1. It follows then that when the caboose operator has made an application in accordance with the instructions of signal S and lapped his valve handle 97 after a light application in accordance with the signal L1 the return indication impulses are modulated at the frequency of M1. These return impulses will operate the relay 109 on the locomotive and cause the indicator 116 to be displayed thereby informing the locomotive operator that the light application he has made on the locomotive has been duplicated in the caboose.

In the event the operator on the locomotive makes a heavy application before he laps his valve handle 4, the pressure device 50 on the locomotive takes its lowest position and a circuit for the modulator M2 is completed from wire 47 through the contacts 59, 49, 57, 55, 48 and 54 of the device 50 and through the contacts 8, 2 and 5 associated with the handle 4 and then to the generator G and back to the other terminal of the modulator M2. The successive impulses transmitted to the traffic rails each now being modulated at the frequency of M2, relay 66 in the caboose is operated in step with each impulse. Relays N and S1 function as before but the polarized armatures of relay P are now held to the left so that the relay SA is energized while the relays EA, R1 and R2 are deenergized. With this set-up of the relays in the caboose, a circuit is completed from positive battery terminal B through wire 72, back contact of armatures 128 and 129, signal L2, the left-hand contact of armature 74 and to the negative terminal C through the front contact of armature 130 of relay 119. The caboose operator now makes a heavy application in accordance with the display of the signal L2, and then laps his brake valve handle 97. As the pressure operated device 50 in the caboose takes its lowest position in response to the heavy reduction of pressure in the equalizing reservoir and in the brake pipe the circuit for the modulator M1 is completed at the contact 138 and at the left-hand contact of the armature 75 of relay P, the circuit otherwise being the same as above traced for the modulator M1 when a light application was made. As modulator M1 is again made active, the return indication impulses actuate the indicating device 116 in a manner the same as before pointed out and the locomotive operator is assured that a heavy brake application has been made at the caboose. It will thus be seen that when, after a service application has been made on the locomotive and the brake valve EV is put at lap position, the man operating the brake mechanism in the caboose will be automatically informed of the kind of a brake application that has been made at the locomotive, and will thus be enabled to make a similar application at the caboose.

In the event an emergency condition is established for the brake valve EV, the relay 17 is held energized by the circuit through the contacts 6, 3 and 33, and the circuit is completed for the modulator M2 at the contact 10 and thus energy modulated at the frequency of M2 is continuously transmitted by the locomotive equipment. This control condition results in the primary relay 66 in the caboose being held continuously energized and in turn the relays N, S1 and SA continuously energized, the relay P held to the left and the relays EA, R1 and R2 all deenergized. With relay S1 held steadily in one position no current is induced in the secondary 126 of the transformer T and thus the relay 119 drops to complete a circuit from the positive terminal B, through the back contact of armature 118, wire 121, signal E, back contact of armature 122, front contact of armature 123 and to the negative terminal C through the front contact of armature 88. Acting under the instructions of the signal E the caboose operator will make an emergency application of the brakes.

The function of sending communicating messages from the locomotive to the caboose is governed by the signal key K. To send a message the key K is depressed to its dotted line position where the relays 36, 35 and 17 are actuated by the contact 27 of the oscillator N2. The outgoing impulses transmitted to the rails by the apparatus of Fig. 1 will be at the rate of the oscillations of N2 in place of N1. That is to say, the impulses now have a frequency of eighty cycles per minute in place of one hundred twenty cycles per minute. In the caboose the oscillator N3, which is preferably similar to the oscillators N1 and N2, has a natural period of eighty cycles per minute. The two halves of its winding 140 are energized by circuits completed by the armature 141 of the relay S1, so arranged that when the armature 141 engages its front contact the circuit is completed for the right-hand half of the winding 140 and when armature 141 engages its back contact the circuit to the left-hand half of the winding 140 is completed. The magnetic fields created by the energizing of the two opposite halves of the winding 140 are such as to cause the armature H of oscillator N3 to be rotated in opposite directions. Continuous operation of relay S1 will therefore cause armature H to operate continuously, the amplitude being large if the frequency of the incoming impulses is the resonant frequency of the tuned element of N3 and small for any other frequency. When the armature H is operated at its maximum swing the contact 142 attached thereto alternately engages right and left-hand contacts to close thereby circuits to the top and bottom winding of a slow-acting relay 143 as can be easily traced. It follows therefore that when the transmitted impulses are governed by the oscillator N2, the relay S1 at the caboose is operated at the resonant frequency of the oscillator N3 and the relay 143 is thereby retained energized. When relay 143 is energized, a simple circuit is completed at the front contact of its armature 144 that includes the signaling device 145, which may be either a lamp or a magnet. Thus as long as the key K on the locomotive is depressed, the signal 145 in the caboose is displayed. By means of prearranged codes any message can be communicated from the locomotive to the caboose during either the running or lap condition of the valve EV. The fact that these messages cannot be sent during the service or emergency condition of the valve EV is no disadvantage as the interval of time that the brake valve occupies either the service or emergency condition is very short.

In order that messages may be transmitted from the caboose the key K1 is provided. When the key K1 is depressed, the return indication impulses are modulated at the frequency of M2 in place of at the frequency of M1. On the locomotive the reception of return impulses modulated by M2 causes the primary relay 110 to be operated. As relay 110 is energized, a circuit is completed from the positive terminal of the battery 13 through wires 37 and 111, front contact of armature 146, lower winding of the relay 113, winding of relay 114 and wire 30 to the negative terminal of battery 13. The magnetic field created by the energizing of the lower winding of the relay 113 is such as to cause the armature 117 to be reversed to its left-hand position, where it closes a circuit to the signaling device 147. Thus modulating the return impulses at the frequency of M2 not only actuates the usual indicating device 116 but also causes the display of the signaling device 147. By operating the key K1 in accordance with a prearranged code, a message can be communicated from the caboose to the locomotive without interfering with the operation of the system.

Referring to the modified form of my invention as disclosed in Figs. 3 and 4, the locomotive is equipped with the usual brake valve EV, as shown in Fig. 3, the handle 4 of which actuates a contactor 184 adapted to engage an arcuate contact 185 in all positions and to engage the contact 150 in both release and running positions, the contact 151 in the lap position and the contact 152 in both the service and emergency positions. The generator G is modulated in the usual manner by the modulator M1 at all times. The oscillator N1 has its field winding 120 connected to the battery 13 through its own contact member 12 so that its armature H is constantly oscillated at a predetermined frequency determined by the bias and the weight of its armature. The contact member 11 of N1 controls the circuits to the relays 35 and 36 in the same manner as described for Fig. 1. It will be recalled that these relays 35 and 36 divide the time into four substantially equal intervals during the first interval of which the relay 36 alone is energized, during the second interval both relays 36 and 35 are energized, during the third interval relay 35 alone is energized and during the fourth interval both relays are deenergized. After the above operation, the cycle starts all over again.

The locomotive is provided with a relay 154 that is first energized by current from battery 13 over a circuit that includes the contact member 12 of oscillator N1, top winding of the relay 154, a normally closed contact 155 of a manually operated switch K2 and hence back to the battery 13. Once the relay 154 is picked up, it is held energized by current from battery 13 through the lower winding of the relay 154, front contact of its own armature 156, a second normally closed contact 157 of switch K2 back to the battery 13.

The generator G and the filter F are alternately connected to the inductor coils 15 and 16 by the operation of the contact member 153 of oscillator N1. Supposing handle 4 is at the running position, the transmitting circuit for the generator G can be traced from the upper terminal of G along wire 158, left-hand contact of 153, front contact of armature 159 of relay 154, contacts 150, 184 and 185, coils 15 and 16 and then to the lower terminal of the generator G. The receiving circuit can be traced from the left-hand terminal of the filter F along wire 160, right-hand contact of 153 and then as above traced for the transmitting circuit through the coils 15 and 16 to the right-hand terminal of filter F. It follows that time is divided substantially equally between sending and receiving periods under the normal running condition of the apparatus and the impulses of modulated current supplied to the traffic rails are at the rate determined by the rate of oscillation of N1.

With the brake valve handle 4 in the lap position, the receiving circuit is as follows: From the left-hand terminal of filter F, wire 160, right-hand contact of 153, front contact of armature 159, wire 161, back contact of armature 164 of relay 36, front contact of armature 186 of relay 35, wire 163, contacts 151, 184 and 185, coils 15 and 16 and hence to the right-hand terminal of filter F. The transmitting circuit established under the lap position extends from the upper terminal of generator G along wire 158, left-hand contact of 153, front contact of armature 159, wire 161, back contact of armature 164, back contact of armature 162 of relay 35 and then as above traced for the receiving circuit to the lower terminal of generator G. Thus we see that under the lap condition the receiving circuit is closed each time the contact member 153 closes toward the right during the interval that relay 36 is deenergized and relay 35 energized, and that the transmitting circuit is closed each time 153 closes toward the left when both relays 36 and 35 are deenergized. In other words, the transmitting circuit is closed during the third interval of the four interval cycle of operation of relays 35 and 36 and the receiving circuit is closed during the fourth interval, that is, immediately following the closing of the transmitting circuit. Thus under the lap position every other sending period as compared with the running condition will be skipped, and the receiving circuit will be closed for the interval directly after an impulse has been sent with the result that only one-half as many impulses are sent and received under the lap condition as in the running condition but with the individual impulses of the same length in both cases.

With the handle 4 placed at either service or emergency position the generator G is continuously connected to the inductor coils 15 and 16 over wire 165, contacts 152, 184 and 185, coils 15 and 16 and hence to the opposite terminal of G, and the receiving circuit is continuously held open. The impulse for a brake application condition is, therefore, a prolonged or continuous impulse.

It is to be noted that when the switch K2 is depressed to its No. 2 position, the circuits for the relay 154 are opened to disconnect the generator G and to connect the filter F directly to the coils 15 and 16 by a circuit to the back contact of the armature 159, contacts 150, 184 and 185 and coils 15 and 16 to the other terminal of F if a handle 4 is in a running position, or from armature 159 through contact 157 of K2, contacts 151, 184 and 185 and hence through the coils 15 and 16 when the handle 4 is in the lap position. This No. 2 position of the switch K2 is utilized for sending communicating messages as will appear later.

The energy applied to the filter F of Fig. 3 is supplied to the input of the amplifier AM, whose output includes a tuned circuit 166, which supplies current to a relay 167 through a full-wave rectifier 168 in a manner similar to that described in Fig. 1. When relay 167 is energized current is supplied from positive battery through the front contact of armature 169 to an indicating device 170 which may be a lamp or a magnet. Thus when the incoming impulse is modulated at the frequency at which the circuit 166 is tuned the relay 167 is energized to produce a display of the indicator 170. The rate at which 170 is displayed will depend upon the rate of the receipt of impulse and if the impulse is a continuous one then indicator 170 is continuously illuminated.

Referring to Fig. 4, the caboose is provided with a brake valve EV1 having three operating conditions, namely, running, lap and brake application. The caboose equipment also includes inductor coils 61 and 62, a generator G, modulator M1, amplifier AM and filter F each similar to the corresponding device of Fig. 2. The modulator M1 is permanently connected to the generator G and the output of the amplifier AM supplies current to the tuned circuit 63 from which current is supplied through the rectifier 67 to the primary relay 65 the same as in Fig. 2. The apparatus of Fig. 4 includes a communication switch Ack and a signal switch K3 both of which normally occupy the position as shown in the drawings. The switch K3 has two positions as indicated by the numerals 1 and 2 while the communication switch has three positions as indicated by the numerals 1, 2 and 3.

When the primary relay 65 is energized current is supplied from the positive terminal of any convenient source such as a battery not shown, along wire 171, winding of the relay N, front contact of the armature 69 of relay 65 and to the negative terminal of the source of current. When relay N picks up, current flows from positive battery along wire 171, winding of relay S1, front contact of armature 77 of relay N and to the negative terminal of the source of current. With relay S1 picked up, current flows from the positive battery along wire 171 through the winding of the relay S2, front contact of armature 172 of relay S1 and to the negative terminal of the current source. The relays N and S1 transfer the coils 61 and 62 from the generator G to the filter F in the same manner as was described for Fig. 2. The input of the filter F is connected to the coils 61 and 62 through either the back contact of armature 79 of relay S1 or through the front contact of the armature 76 of relay N. The generator G is connected to the coils 61 and 62 during the release period of relay S1 after the relay N is deenergized by the circuit completed at the front contact of the armature 84 of relay S1 and the back contact of armature 76 of relay N. It is to be here noted that the transmitting circuit from the generator G also includes the contact 173, of the communication switch Ack in either of its No. 1 or No. 2 positions. The relay S2 of Fig. 4 is provided with a release period long enough that the relay will remain energized over a complete cycle of impulses from the locomotive and the function of this relay will appear later.

A check signal 174 is provided with a circuit from positive battery through signal 174, wire 175, front contact of armature 176 of relay N and to the negative terminal of the battery. Therefore, every time an impulse is received in the caboose so that the primary relay 65 is operated and relay N picked up, the check signal 174 will be displayed. The duration for which the signal 174 is displayed will be equal to the duration of the impulse and if the impulse be a continuous one then the signal will remain continuously displayed. From what was said above regarding the transmission of impulses from the locomotive, it is evident that this check signal will be displayed at one rate under the running condition of the locomotive apparatus, displayed one-half as fast in the lap condition and displayed continuously for either the service or emergency condition.

Whenever the operator on the locomotive puts the handle 4 of his brake valve at either service or emergency position so that the current impulse transmitted to the traffic rails lasts for a considerable length of time, the relay N remains energized so that the slow-releasing relay 177, which is normally energized periodically by a circuit that includes the back contact of armature 176 as will be easily traced in Fig. 4, becomes deenergized and closes a circuit to an application signaling device 178. The circuit for this device 178 extends from positive battery through device 178, back contact of armature 179 of relay 177, front contact of armature 180 of relay S2 and to the negative terminal. I propose to make this signaling device 178 both audible and visual and thus it follows that a brake application condition on the locomotive is indicated in the caboose by the continuous display of the check signal 174 and by the audible and visual display of the signaling device 178. As soon as intermittent impulses begin to be received again at the caboose the relay 177 is again energized and the signal 178 rendered inactive.

The normal operation of the system of Figs. 3 and 4 can be summed up as follows: With the valve EV on the locomotive placed in either release or running condition, the locomotive apparatus is alternated between sending and receiving once each cycle of oscillator N1. During the sending period, a modulated current impulse is supplied to the traffic rails which is picked up at the caboose and applied to the receiving circuit tuned to the modulating frequency of the impulse to operate the primary relay 65 which, in turn, operates the relays N, S1, S2 and 177 in such a manner that the check signal 174 is illuminated during the impulse. At the end of the impulse sent out from the locomotive the caboose apparatus is transferred to its sending condition by the action on the relays S1 and N and a return impulse is supplied to the traffic rails modulated at the frequency of M1 in the caboose. This return impulse is picked up at the locomotive and applied to its receiving circuit tuned to be responsive to the frequency of M1 to operate the relay 167 so that the indicating signal 170 is illuminated during the impulse. This blinking or display of the check signal in the caboose and the indicating signal on the locomotive will be continued at the given rate as determined by the oscillator N1 as long as either the release or running condition remains in effect. The display of the check signal in the caboose at this given rate indicates to the caboose operator that he is to establish a running condition for his valve EV1. The display of the indication signal shows the locomotive operator that the control impulses are getting through to the caboose and has established a condition corresponding to the running condition for the caboose relays.

With the brake valve EV placed at either service or emergency condition, the impulse supplied to the traffic rails is continuous. When a continuous impulse is picked up at the caboose, the relays N, S1 and S2 are held energized while the relay 177 is deenergized with the result that not only is the check signal 174 displayed continuously but the special application signaling device 178 is rendered active. The caboose operator now knows that he must make a brake application with his valve EV1.

When the locomotive operator laps his brake handle 4, intermittent impulses are again transmitted from the locomotive but only one-half as fast as when under the running condition as every other impulse is skipped. The caboose apparatus receives these impulses and causes the relays N and S1 to be operated and relays S2 and 177 to remain energized the same as under the running condition except that the operation of relays N and S1 is now only one-half as fast. The check signal 174 will therefore be displayed at one-half the rate at which it was displayed under the running condition and the operator on the caboose will know that he is to lap his valve EV1. The return impulse will likewise cause the indication signal 170 to be displayed at one-half the rate at which it was displayed under the running condition and thus the locomotive operator will know that the caboose relays are in the lap condition.

When the locomotive operator wishes to communicate with the crew in the caboose, the procedure is as follows. The operator on the locomotive moves his signal switch K2 to its No. 2 position where the circuits to both windings of the relay 154 are open and that relay deenergized. As relay 154 drops, the sending circuit is opened at the front contact of armature 159 while the receiving circuit to the filter F is held closed at the back contact of armature 159. The receiving circuit is completed through the contact 150 when the handle 4 is in the running position, or is completed through the contact 157 of switch K2 and the contact 151 when the handle 4 is at the lap position as was previously pointed out. As no impulses are now sent out from the locomotive, the caboose operator will notice that the check signal 174 is no longer being displayed. This informs him that communication is desired and he, therefore, puts his communication switch Ack in its No. 2 position. An extra circuit is now completed for the relay S1 which extends from the positive battery terminal along wire 171, winding of relay S1, contact 181 of switch Ack to the negative terminal of the source of power. With relay S1 held energized and as relay N is now deenergized, the sending circuit on the caboose is held closed and a prolonged impulse supplied to the traffic rails. After a few seconds the caboose operator restores his communication switch to its normal position and the outgoing impulse is stopped. In the meantime the locomotive operator has noted this prolonged impulse by the prolonged display of his indication signal 170 and as soon as it ceases, he knows that the caboose equipment is ready to receive his message. The locomotive operator now moves his switch K2 back to its normal position. The first time oscillator N1 closes its contact 12, the relay 154 is picked up and then retained energized by the closing of the circuit to its lower winding. With relay 154 energized the locomotive equipment resumes its normal operation to transmit intermittent impulses as described above. The impulses are alternately sent and received as in their ordinary operation of the system and thus the locomotive operator can tell how many impulses have been sent from the locomotive by counting the return impulses as they cause the display of the signal 170. As soon as he has sent the number of impulses necessary to complete a prearranged code message he again places his switch K2 at its No. 2 position to stop sending and indicate to the caboose operator that the message is completed. The caboose operator will now recognize the receipt of the message by shifting his communication switch to its No. 2 position for causing a prolonged display of the signal 170 on the locomotive. By a prearranged time interval for the display of the signal 170 the caboose operator can inform the locomotive operator that the message is received or can call for repetition of the message, in which case the locomotive operator will repeat the message in the same manner as just described. At the completion of the message, both operators will reset their switches to the normal position and the normal operation of the system will be resumed. It is to be noted that relay 154 can be picked up to start a message only as armature H swings to close contact 12 at which time it also closes the output at contact 153. This avoids the possibility of splitting an outgoing impulse at the start of a message that might cause a wrong message to be received.

If a message is to be sent from the caboose, the procedure is as follows. The caboose operator puts his communication switch in its No. 2 position. The sending circuit now being held open at contact 173 of switch Ack no return impulses are transmitted and the signal 170 will cease to be displayed. As signal 170 ceases, the locomotive operator will know that communication is desired. To indicate that he is ready the locomotive operator moves his switch K2 to its No. 2 position thereby stopping the transmission of impulses and putting his apparatus in the receiving condition as outlined above. As soon as the check signals cease in the caboose, the operator there proceeds with the sending of the message by first returning his switch Ack to its normal position and then moving the signal switch K3 to its No. 2 position. A circuit can now be traced for the relay N from the positive battery along wire 171, winding of relay N, back contact of armature 182 of relay S2 as that relay drops at the end of its slow-release period due to its being deenergized in response to the stopping of the impulses from the locomotive, contact 183 of K3 to the negative terminal of the source of power. As the relay N becomes energized both relays S1 and S2 are in turn energized in the usual manner. As relay S2 picks up, the circuit to relay N is opened at the back contact of the armature 182 and that relay drops. With relay N down and relay S1 retained energized during its release period the sending circuit for the generator G to the coils 61 and 62 is closed and an impulse transmitted to the traffic rails which causes signal 170 on the locomotive to be displayed. At the end of the release period of relay S1 this relay drops to open the circuit to the relay S2 and when that relay drops at the end of its release period it again closes the circuit to the relay N and the operation of these relays is repeated. It follows that with the switch Ack at its normal position and switch K3 at its No. 2 position intermittent impulses will be transmitted to the traffic rails which will cause signal 170 to be displayed during each impulse due to the fact that the locomotive equipment is now held constantly at its receiving condition by the switch K2 having been placed at its No. 2 position. The number of impulses transmitted can be counted by the caboose operator by watching the check signal 174. This signal 174 is illuminated just before the first impulse is sent out during the interval that relay N is picked up and then is illuminated just before each succeeding impulse each time relay N is reenergized. If the caboose operator therefore counts 0, 1, 2, 3, etc. as the check signal 174 is displayed, he will be able to keep track of the number of impulses transmitted. For example, to send two impulses he would count 0, 1, 2 and then restore the switch K3 to its normal position as he counts 2 and he will have sent two impulses. These impulses are received on the locomotive by the intermittent display of the signal 170. The operator there counts the number of impulses and thereby determines the code message. As the caboose operator restores his switch K3 to its normal position he will wait for a signal of recognition from the locomotive which can be accomplished by the locomotive operator sending a given number of impulses. As soon as the message is completed the switches are returned to their normal position and the usual operation of the system is resumed.

The case of failure of the control signal will be covered by issued instructions to the operators. If a failure should occur to the signal 170 on the locomotive, the operator would, of course, place his switch K2 at its No. 2 position expecting a message. This would stop the check signal at the caboose, so that the operator there would likewise expect a message and proceed accordingly. This procedure would result in no signals being displayed in either end of the train. With such a condition existing say for a prearranged period of time such as ten seconds both operators would act under the issued instructions and make a brake application so as to bring the train under full control. If the failure occurs to the check signal 174 in the caboose, the operator there would first expect a message and act accordingly which may or may not cause a change in the display of the signal 170 on the locomotive. As no message follows, however, the caboose operator will know that there is a failure of the system and he would place his communication switch Ack at its No. 3 position to stop the return impulses. As now no signals are displayed at either end of the train both operators will act to apply the brakes at the expiration of the prearranged period of time which we have stated as being ten seconds. By such a prearranged procedure a failure of the system will result in a service application at both ends of the train at approximately the same time and any damage to the train will be avoided.

Control systems such as here proposed enable the operators at two different points on the train to each establish manually corresponding brake conditions substantially simultaneously with the supervision of the control being placed in the hands of the operator at the head end of the train. While no brake condition is automatically established in the event of a failure in the system attention is called to the fact that all the equipment in the caboose must be energized in order to select the running signal. The change from the running condition to a brake application condition requires only the dropping of certain relays which can always be accomplished with a high degree of reliability and thus the systems here provided have a high degree of safety. While no return indication is provided for either a service or emergency condition such indication hardly seems necessary as the train is already being stopped and also due to the fact that the interval of time during which the brake valve handle is in the service or emergency condition is very short.

As stated above my invention is not limited to a control system for the brakes of railway trains but is equally adaptable to other applications. The forms of my invention here disclosed will serve, however, to illustrate the principle by which two mechanisms having a plurality of operating conditions and located at remote points can be each controlled manually in accordance with established signals so that corresponding conditions of the mechanisms can be set up by the operators substantially simultaneously.

Although I have herein shown and described only certain forms of apparatus embodying my invention, it is understood that various changes and modifications may be made therein within the scope of the appended claims without departing from the spirit and scope of my invention.

Having thus described my invention, what I claim is:

1. Apparatus for the control of the brakes of a railway train including; a manually operated brake controlling mechanism capable of producing a running, a lap and a brake applying condition of the train brakes; a signaling device adapted to display a different signal for each condition of the train brakes, an electroresponsive means selectively responsive to different codes of current to select the different signals and thereby determine the condition to be established by the operator of said brake controlling mechanism, means located at a remote point on the train capable of transmitting different current codes to said electroresponsive means, and a manually operated device at said remote point to select the different current codes.

2. Apparatus for the control of the brakes of a railway train including; a manually operated brake controlling valve located at one point on a train and capable of producing a running, a lap and a brake applying condition of the brake pipe pressure of the train; a signaling device located at the same point on the train adapted to display a different signal for each condition of brake pipe pressure, an electroresponsive means selectively responsive to different codes of current to select the different signals and thereby determine the condition to be established by the operator of said brake controlling valve, means located at another point on the train capable of transmitting different current codes to said electroresponsive means, and a manually operated device at said other point on the train to select the different current codes.

3. Apparatus for the control of the brakes of a railway train including; a manually operated brake controlling valve located at each end of a train each capable of producing corresponding conditions of the brake pipe pressure of the train, a signaling device located at one end of the train adapted to display a different signal for each condition of the brake pipe pressure, an electroresponsive means selectively responsive to different codes of current to select the different signals and thereby indicate the condition to be set up by the operator of the brake controlling valve located at the same end of the train as the signaling device, a transmitting means at the opposite end of the train capable of transmitting different codes of current to the electroresponsive means, and means associated with the brake controlling valve located at the same end as the transmitting means to select the code to be transmitted in a manner to cause the display of a signal of the signaling device that corresponds to the brake pipe pressure condition set up by the operator of said last mentioned brake controlling valve.

4. Apparatus for the control of the brakes of a railway train including, two manually operated brake controlling valves located at different points on the train and each adapted to produce a release and a brake applying condition of the brake pipe pressure of the train, a signaling device located at one of said valves adapted to display either a release or a brake applying signal, an electroresponsive means slectively responsive to different codes of current to select one or the other of said signals and thereby determine the condition of the brake valve to be set up by the operator of the brake valve located at the same point on the train as the signal device, means associated with the valve located at the other point on the train capable of transmitting either a release or brake applying code to the electroresponsive means, and means controlled by the operator of the last mentioned valve to select the code corresponding to the condition of brake pipe pressure he has established by his brake valve.

5. Apparatus for the control of the brakes of a railway train including; a manually operated brake controlling mechanism capable of producing the running, lap, service and emergency conditions of the train brakes; a signaling device adapted to display a different signal for each of the several brake conditions, an electroresponsive means associated with said mechanism selectively responsive to different codes of current to select the different signals of the signaling device and thereby determine the condition to be established by the operator of the brake controlling mechanism, means located at a remote point capable of transmitting different current codes to said electroresponsive means, and a manually operated means at said remote point to select the current code to be transmitted.

6. The method of controlling the air brakes of a railway train that consists in providing two manually operated brake controlling valves one at each end of the train and then automatically transmitting from one end to the other end of the train distinctive codes of current in accordance with the condition of the brake valve set up by the operator at the transmitting end of the train, and receiving and translating these codes at the other end into different visual signals to enable the operator of the brake valve at said other end to set his brake in the same condition as that established at the transmitting end.

7. The method of controlling the air brakes of a railway train that consists in providing two similar manually operated brake controlling valves one at each end of the train and then automatically transmitting from the front end to the rear end of the train distinctive codes in accordance with the position of the brake controlling valve and in accordance with the degree of the brake application established by the operator at the front end, and receiving and translating these codes at the rear end into different visual signals to enable the operator of the brake valve at the rear end to simultaneously establish the same position and degree of brake application by his brake valve.

8. The method of controlling two manually operated mechanisms that have a plurality of similar operating conditions but which are spaced apart, that consists in automatically transmitting from one mechanism a distinctive current code for each condition of the mechanism, receiving and translating the transmitted code into a signal at the other mechanism to thus enable the operator of said other mechanism to at once establish the same condition for his mechanism as has been established by the operator at the first mentioned mechanism and then periodically exchange automatically a check impulse between the two mechanisms to indicate the operativeness of the communication channel.

9. Apparatus for the control of the brakes of a railway train including, a manually operated brake controlling valve located at each of two different points on a train each capable of producing corresponding degrees of brake application, a signaling device located at one of said points adapted to display a different signal for different degrees of brake application, an electroresponsive means selectively responsive to different codes of current to select the different signals and thereby indicate the degree of brake application to be established by the operator of the brake valve located at the same point as the signaling device, means associated with the brake controlling valve located at the other point capable of transmitting different codes of current to the electroresponsive means, and means controlled by the brake valve at said other point to select the code in accordance with the degree of brake application established by the operator of the brake valve at said other point.

10. A control system including, a transmitting circuit, a source of carrier current for the transmitting circuit, two modulators; a control means having different positions adapted to modulate the carrier current alternately by the two modulators in one position, to modulate the carrier current periodically by one modulator in a second position, to modulate it periodically by the other modulator in a third position, to modulate it continuously by one modulator in a fourth position and to modulate it continuously by the other modulator in a fifth position; a mechanism located at a remote point having five distinctive operating conditions, and a receiving and decoding means influenced by the transmitting circuit adapted to establish one condition of the mechanism in response to the alternate modulation of the carrier current, to establish a second condition in response to the periodic modulation by one modulator, to establish a third condition in response to the periodic modulation by the other modulator, to establish the fourth condition in response to the continuous modulation by the one modulator and to establish the fifth condition in response to the continuous modulation by the other modulator.

11. A control system including, two manually operated mechanisms spaced apart each adapted to assume several corresponding operating conditions, a signal device located at one mechanism adapted to display a different signal for each operating condition of the mechanisms, an electroresponsive means selectively responsive to different codes of current to select the different signals, means associated with the other mechanism to automatically establish a distinctive current code in accordance with the operating condition as set up by its operator, and a transmitting and receiving means influenced by the code established to govern the electroresponsive means and thereby display a signal that will enable the operator of the mechanism located at the signaling device to establish the same operating condition for his mechanism.

12. Apparatus for the control of the brakes of a railway train including; a manually operative brake controlling valve located at each of two different points on a train each capable of producing corresponding degrees of brake application, a signaling device located at one of said points adapted to display a different signal for different degrees of brake application, an electroresponsive means selectively responsive to different codes of current to select the different signals and thereby indicate the degree of brake application to be established by the operator of the brake valve located at the same point as the signaling device, means associated with the brake controlling valve located at the other point capable of transmitting different codes of current to the electroresponsive means, a pressure responsive device governed by the pressure of the equalizing reservoir, and means controlled jointly by the brake valve at said other point and by the pressure responsive device to select the code in accordance with the degree of brake application established by the operator of the brake valve at said other point.

13. Apparatus for the control of a railway train including, means located at one point on a train capable of transmitting periodic impulses of current of a predetermined frequency at a plurality of different rates and thereby establish different codes, an electroresponsive means located at another point on the train selectively tuned to receive current of said frequency, and signaling means including a visual signal controlled by said electroresponsive means to display said signal once each current impulse and thereby distinguish between the different codes by the rate at which said signal is displayed.

14. Apparatus for the control of a railway train including, a manually controlled means located at one point on a train capable of transmitting periodic impulses of current of a predetermined frequency at a plurality of different rates or to transmit said current uninterrupted and thereby establish different signal codes, an electroresponsive means located at another point on the train selectively tuned to receive current of said frequency, and signaling means including a visual signal controlled by said electroresponsive means to display said signal once each current impulse or to display said signal continuously in response to uninterrupted current and thereby distinguish between the different codes by the manner in which said signal is displayed.

15. Apparatus for the control of the brakes of a railway train including, two manually operated brake controlling valves located at different points on the train and each adapted to produce a corresponding condition of the brake pipe pressure of the train, a signaling device located at one of said valves, an electroresponsive means influenced by a given coded current to display said signaling device to indicate to the operator of the brake valve at the same point on the train as the signal to establish the given condition of brake pipe pressure, and means associated with the valve located at the other point on the train capable of transmitting the given coded current to the electroresponsive device automatically rendered active in response to the valve at said other point being set to establish the given condition of brake pipe pressure.

In testimony whereof I affix my signature.

ANDREW J. SORENSEN.